(12) United States Patent
Muthukaruppan et al.

(10) Patent No.: US 10,284,457 B2
(45) Date of Patent: May 7, 2019

(54) SYSTEM AND METHOD FOR VIRTUAL LINK TRUNKING

(71) Applicant: DELL PRODUCTS, L.P., Round Rock, TX (US)

(72) Inventors: Senthil Nathan Muthukaruppan, Chennai (IN); Shankara Ramamurthy, Chennai (IN); Pugalendran Rajendran, Mettupalayan (IN)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 15/207,683

(22) Filed: Jul. 12, 2016

(65) Prior Publication Data

US 2018/0019938 A1 Jan. 18, 2018

(51) Int. Cl.
| | |
|---|---|
| *H04L 12/24* | (2006.01) |
| *H04L 12/709* | (2013.01) |
| *H04L 12/721* | (2013.01) |
| *H04L 12/741* | (2013.01) |
| *H04L 12/751* | (2013.01) |
| *H04L 12/753* | (2013.01) |

(52) U.S. Cl.
CPC ............. *H04L 45/02* (2013.01); *H04L 45/12* (2013.01); *H04L 45/245* (2013.01); *H04L 45/48* (2013.01); *H04L 45/54* (2013.01); *H04L 45/745* (2013.01); *H04L 41/0668* (2013.01); *Y02D 50/30* (2018.01)

(58) Field of Classification Search
CPC ............. H04L 12/4675; H04L 12/4679; H04L 41/0896; H04L 45/00; H04L 45/02; H04L 45/12; H04L 45/245; H04L 45/48; H04L 45/64; H04L 45/745; H04L 49/00; H04L 49/25; H04L 49/254; H04L 49/30; H04L 49/351; H04L 49/354; H04L 61/6022
See application file for complete search history.

(56) References Cited

U.S. PATENT DOCUMENTS

| | | | | |
|---|---|---|---|---|
| 4,885,684 A | * | 12/1989 | Austin | ...................... G06F 8/30 |
| | | | | 717/149 |
| 5,583,858 A | * | 12/1996 | Hanaoka | ............. H04L 12/5601 |
| | | | | 370/235.1 |
| 5,872,783 A | * | 2/1999 | Chin | ................... H04L 49/3009 |
| | | | | 370/395.32 |
| 6,016,310 A | * | 1/2000 | Muller | ................ H04L 12/4633 |
| | | | | 370/255 |

(Continued)

*Primary Examiner* — Eric Nowlin
(74) *Attorney, Agent, or Firm* — Isidore PLLC

(57) ABSTRACT

A method, an information handling system (IHS), and a virtual link trunking (VLT) system for determining VLT ports to block and unblock in an IHS. The method includes calculating a forwarding table index for a local switch of currently active and inactive switch peers for a VLT port. A pre-determined forwarding table is retrieved from a memory containing a plurality of port blocking and unblocking actions for the switch peers. Current port blocking and unblocking actions are identified in the pre-determined forwarding table corresponding to the forwarding table index. Changes are determined between the previous port blocking and unblocking actions and the current port blocking and unblocking actions. The input/output (I/O) ports are configured for the local switch based on the determined changes in the port blocking and unblocking actions.

18 Claims, 10 Drawing Sheets

(56) References Cited

U.S. PATENT DOCUMENTS

| | | | | |
|---|---|---|---|---|
| 6,192,051 B1* | 2/2001 | Lipman | H04L 45/742 | 370/389 |
| 6,407,985 B1* | 6/2002 | Jain | H04L 45/00 | 370/256 |
| 6,735,198 B1* | 5/2004 | Edsall | H04L 45/54 | 370/389 |
| 6,807,172 B1* | 10/2004 | Levenson | H04L 49/3009 | 370/389 |
| 6,819,654 B2* | 11/2004 | Soloway | H04L 45/00 | 370/232 |
| 6,874,033 B1* | 3/2005 | Sugai | H04L 45/742 | 398/49 |
| 6,987,735 B2* | 1/2006 | Basso | H04L 45/00 | 370/238 |
| 7,027,406 B1* | 4/2006 | Shabtay | H04L 12/4625 | 370/249 |
| 7,050,392 B2* | 5/2006 | Valdevit | H04L 45/02 | 370/216 |
| 7,054,311 B2* | 5/2006 | Norman | H04L 45/00 | 370/378 |
| 7,113,581 B2* | 9/2006 | Benedyk | H04M 7/125 | 370/225 |
| 7,180,887 B1* | 2/2007 | Schwaderer | H04L 45/742 | 370/351 |
| 7,227,862 B2* | 6/2007 | Kalkunte | H04L 49/3009 | 370/389 |
| 7,243,160 B2* | 7/2007 | Brahmaroutu | H04L 45/02 | 370/237 |
| 7,492,713 B1* | 2/2009 | Turner | H04L 12/4633 | 370/231 |
| 7,519,733 B1* | 4/2009 | Thubert | H04L 12/18 | 709/232 |
| 7,693,152 B2* | 4/2010 | Deng | H04L 12/4625 | 370/392 |
| 7,869,352 B1* | 1/2011 | Turner | H04L 12/4633 | 370/229 |
| 8,014,390 B2* | 9/2011 | Kalkunte | H04L 45/00 | 370/389 |
| 8,175,107 B1* | 5/2012 | Yalagandula | H04L 45/7453 | 370/408 |
| 8,279,874 B1* | 10/2012 | Lu | H04L 41/0806 | 370/395.2 |
| 8,654,630 B2* | 2/2014 | Lei | H04L 45/00 | 370/219 |
| 8,804,707 B2* | 8/2014 | Goodfellow | H04L 45/12 | 370/238 |
| 8,879,381 B2* | 11/2014 | Wu | H04L 12/42 | 370/216 |
| 8,891,540 B2* | 11/2014 | Krishna | H04L 61/2528 | 370/401 |
| 8,909,726 B1* | 12/2014 | Eckert | H04L 45/74 | 709/207 |
| 8,976,659 B2* | 3/2015 | Kulkarni | H04L 12/4625 | 370/235 |
| 9,270,592 B1* | 2/2016 | Sites | H04L 45/7453 | |
| 9,351,324 B2* | 5/2016 | Krishna | H04L 61/2528 | |
| 9,369,388 B2* | 6/2016 | Shen | H04L 47/125 | |
| 9,385,942 B2* | 7/2016 | Grosser, Jr. | H04L 41/12 | |
| 9,432,205 B2* | 8/2016 | Tian | H04L 12/1886 | |
| 9,436,623 B2* | 9/2016 | Wertheimer | G06F 13/4022 | |
| 9,461,839 B2* | 10/2016 | Cecil | H04L 41/0663 | |
| 9,660,913 B2* | 5/2017 | Newton | H04L 41/0893 | |
| 9,800,456 B2* | 10/2017 | Komori | H04L 29/10 | |
| 9,853,822 B2* | 12/2017 | Wijnands | H04L 12/1886 | |
| 2001/0055380 A1* | 12/2001 | Benedyk | H04M 7/125 | 379/219 |
| 2002/0018465 A1* | 2/2002 | Rosenberg | H04L 12/6418 | 370/356 |
| 2002/0101867 A1* | 8/2002 | O'Callaghan | H04L 12/4641 | 370/389 |
| 2003/0002443 A1* | 1/2003 | Basso | H04L 45/00 | 370/237 |
| 2003/0023701 A1* | 1/2003 | Norman | H04L 45/00 | 709/214 |
| 2003/0033427 A1* | 2/2003 | Brahmaroutu | H04L 45/02 | 709/238 |
| 2003/0185221 A1* | 10/2003 | Deikman | H04L 45/54 | 370/401 |
| 2004/0030766 A1* | 2/2004 | Witkowski | H04L 41/082 | 709/223 |
| 2006/0114908 A1* | 6/2006 | Kalkunte | H04L 45/00 | 370/392 |
| 2007/0016637 A1* | 1/2007 | Brawn | H04L 47/2441 | 709/209 |
| 2007/0276845 A1* | 11/2007 | Geilich | G06F 17/30241 | |
| 2007/0280104 A1* | 12/2007 | Miyoshi | H04L 45/00 | 370/229 |
| 2008/0008182 A1* | 1/2008 | Deng | H04L 12/4625 | 370/392 |
| 2009/0268610 A1* | 10/2009 | Wu | H04L 12/42 | 370/222 |
| 2009/0316602 A1* | 12/2009 | Nandy | H04L 45/02 | 370/254 |
| 2011/0228669 A1* | 9/2011 | Lei | H04L 45/00 | 370/219 |
| 2012/0243552 A1* | 9/2012 | Goodfellow | H04L 45/12 | 370/419 |
| 2013/0094361 A1* | 4/2013 | Kulkarni | H04L 12/4625 | 370/235 |
| 2013/0188514 A1* | 7/2013 | Jain | H04L 41/042 | 370/254 |
| 2013/0242998 A1* | 9/2013 | Deshpande | H04L 45/02 | 370/392 |
| 2013/0301522 A1* | 11/2013 | Krishna | H04L 61/2528 | 370/328 |
| 2014/0068099 A1* | 3/2014 | Komori | H04L 29/10 | 709/236 |
| 2014/0082237 A1* | 3/2014 | Wertheimer | G06F 13/14 | 710/104 |
| 2014/0211630 A1* | 7/2014 | Cavanna | H04L 49/25 | 370/235 |
| 2014/0314086 A1* | 10/2014 | Roper | H04L 45/745 | 370/392 |
| 2015/0055451 A1* | 2/2015 | Holmberg | H04L 49/557 | 370/218 |
| 2015/0071117 A1* | 3/2015 | Grosser | H04L 12/56 | 370/254 |
| 2015/0071225 A1* | 3/2015 | Krishna | H04L 61/2528 | 370/329 |
| 2015/0085641 A1* | 3/2015 | Cecil | H04L 41/0663 | 370/223 |
| 2015/0138986 A1* | 5/2015 | Gale | H04L 47/125 | 370/237 |
| 2015/0188760 A1* | 7/2015 | Anumala | H04L 41/083 | 370/254 |
| 2015/0188805 A1* | 7/2015 | Ghanwani | H04L 45/48 | 370/254 |
| 2015/0256405 A1* | 9/2015 | Janardhanan | H04L 45/48 | 370/255 |
| 2015/0263889 A1* | 9/2015 | Newton | H04L 47/10 | 370/254 |
| 2015/0319083 A1* | 11/2015 | Grosser, Jr. | H04L 41/12 | 370/218 |
| 2016/0043933 A1* | 2/2016 | Gopalarathnam | H04L 45/124 | 709/226 |
| 2016/0127142 A1* | 5/2016 | Tian | H04L 12/1886 | 370/390 |
| 2017/0118066 A1* | 4/2017 | Mathew | H04L 41/0663 | |
| 2017/0155599 A1* | 6/2017 | Vobbilisetty | H04L 49/25 | |
| 2017/0324682 A1* | 11/2017 | Vobbilisetty | H04L 49/252 | |
| 2017/0331724 A1* | 11/2017 | Carney | H04L 45/22 | |
| 2017/0331743 A1* | 11/2017 | Rimmer | H04L 45/74 | |
| 2018/0013614 A1* | 1/2018 | Vobbilisetty | H04L 12/4641 | |

* cited by examiner

| INDEX (S4S3S2) 520 | ACTION 502 | | |
|---|---|---|---|
| | S4 340 | S3 330 | S2 320 |
| 0 (000) 522 | UNBLOCK | UNBLOCK | UNBLOCK |
| 1 (001) 524 | UNBLOCK | BLOCK | BLOCK |
| 2 (010) 526 | UNBLOCK | BLOCK | UNBLOCK |
| 3 (011) 528 | UNBLOCK | BLOCK | BLOCK |
| 4 (100) 530 | BLOCK | BLOCK | UNBLOCK |
| 5 (101) 532 | BLOCK | BLOCK | BLOCK |
| 6 (110) 534 | BLOCK | BLOCK | UNBLOCK |
| 7 (111) 536 | BLOCK | BLOCK | BLOCK |

FIG. 5

| INDEX (S4S3S2) 520 | ACTION 502 | | |
| --- | --- | --- | --- |
| | S1 504 | S3 506 | S2 508 |
| 0 (000) 522 | UNBLOCK | UNBLOCK | UNBLOCK |
| 1 (001) 524 | UNBLOCK | BLOCK | BLOCK |
| 2 (010) 526 | UNBLOCK | BLOCK | UNBLOCK |
| 3 (011) 528 | UNBLOCK | BLOCK | BLOCK |
| 4 (100) 530 | BLOCK | BLOCK | UNBLOCK |
| 5 (101) 532 | BLOCK | BLOCK | BLOCK |
| 6 (110) 534 | BLOCK | BLOCK | UNBLOCK |
| 7 (111) 536 | BLOCK | BLOCK | BLOCK |

FIG. 6A

| INDEX (S4S3S2) 520 | ACTION 502 | | |
| --- | --- | --- | --- |
| | S1 504 | S3 506 | S2 508 |
| 0 (000) 522 | UNBLOCK | UNBLOCK | UNBLOCK |
| 1 (001) 524 | UNBLOCK | BLOCK | BLOCK |
| 2 (010) 526 | BLOCK | BLOCK | BLOCK |
| 3 (011) 528 | BLOCK | BLOCK | BLOCK |
| 4 (100) 530 | BLOCK | BLOCK | UNBLOCK |
| 5 (101) 532 | BLOCK | BLOCK | BLOCK |
| 6 (110) 534 | BLOCK | BLOCK | BLOCK |
| 7 (111) 536 | BLOCK | BLOCK | BLOCK |

650

SYSTEM AND METHOD FOR VIRTUAL LINK TRUNKING

BACKGROUND

1. Technical Field

The present disclosure generally relates to information handling systems and in particular to a system and method for virtual link trunking in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide redundant links between network devices. By employing redundant links, network traffic between two network devices that would normally be interrupted can be re-routed to the back-up link in the event that the primary link fails.

Although having redundant links is helpful for failure situations, redundant links can create network loops, which can be fatal to networks. To remove the loops, a protocol named spanning tree protocol (STP) can be used. STP is a layer-2 protocol that runs on network devices, such as bridges and switches, to ensure that loops are not created when there are redundant paths in the network. The result of the STP is that some links are inactive unless a primary link fails. Thus, networks using redundant links with STP have links that are underutilized.

Networks need to be reliable and they must also provide adequate data throughput or bandwidth. One way to increase capacity is by recapturing unused network capacity using link aggregation (LAG). LAG refers to various methods of aggregating network connections to increase data throughput while still supporting fault tolerance in case of failures. LAG involves grouping two or more physical data network links between two network devices into one logical link in which the two or more physical network links may be treated as a single logical link. Initial implementation of LAG required that the aggregated links terminate on a single switch. Later implementations were developed that allowed the links to terminate on two switches. An example of a mechanism used to support LAG networking across more than one device is multi-chassis link aggregation (MLAG).

A major complication of existing link technologies is that they have difficulty when traffic destined for a remote server enters a non-working link. Determining new links and blocking links to prevent loops can take an excessive amount of time, resulting in periods when traffic cannot be forwarded over the network and slowing the overall performance of the network.

BRIEF SUMMARY

Disclosed is a method, an information handling system (IHS) and a virtual link trunking (VLT) system for determining which VLT ports in an IHS to block and/or to unblock.

According to one embodiment, a method of communication for an information handling system is provided that utilizes VLT. The method includes calculating a forwarding table index for a local switch of currently active and inactive switch peers for a VLT port. A pre-determined forwarding table is retrieved from a memory containing a plurality of port blocking and unblocking actions for the switch peers. Current port blocking and unblocking actions are identified in the pre-determined forwarding table corresponding to the forwarding table index. Changes are determined between the previous port blocking and unblocking actions and the current port blocking and unblocking actions. The I/O ports are configured for the local switch based on the determined changes in the port blocking and unblocking actions.

Also disclosed is an information handling system (IHS) that includes a plurality of switches, where at least a portion of the switches facilitate communications with at least one processing node (PN) via a plurality of input/output (I/O) ports. The switches facilitate communication with each other via a plurality of inter-connecting links (ICLs). The switches are configurable to be part of one or more virtual link trunking (VLT) ports. At least one of the switches includes a processor and a memory device communicatively coupled to the processor. The memory device stores VLT software including one or more pre-determined forwarding tables containing a plurality of port blocking and unblocking actions for switch peers. The VLT software configures a local switch to calculate a forwarding table index for the local switch of currently active and inactive switch peers for a VLT port and to retrieve a corresponding pre-determined forwarding table from the memory. The VLT software further configures the local switch to identify current port blocking and unblocking actions in the pre-determined forwarding table corresponding to the forwarding table index and to determine changes between previous port blocking and unblocking actions and the current port blocking and unblocking actions. The VLT software further configures the local switch to configure a plurality of I/O ports for the local switch based on the determined changes in the port blocking and unblocking actions.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates a forwarding table that contains block and unblock actions for switch nodes, according to one or more embodiments;

FIGS. 6A and 6B illustrate other examples of forwarding tables that contain block and unblock actions for switch nodes, according to one or more embodiments;

DETAILED DESCRIPTION

The illustrative embodiments provide a method, a virtual link trunking (VLT) system and an information handling system (IHS) for determining VLT ports to block and unblock in an IHS that includes several switches.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
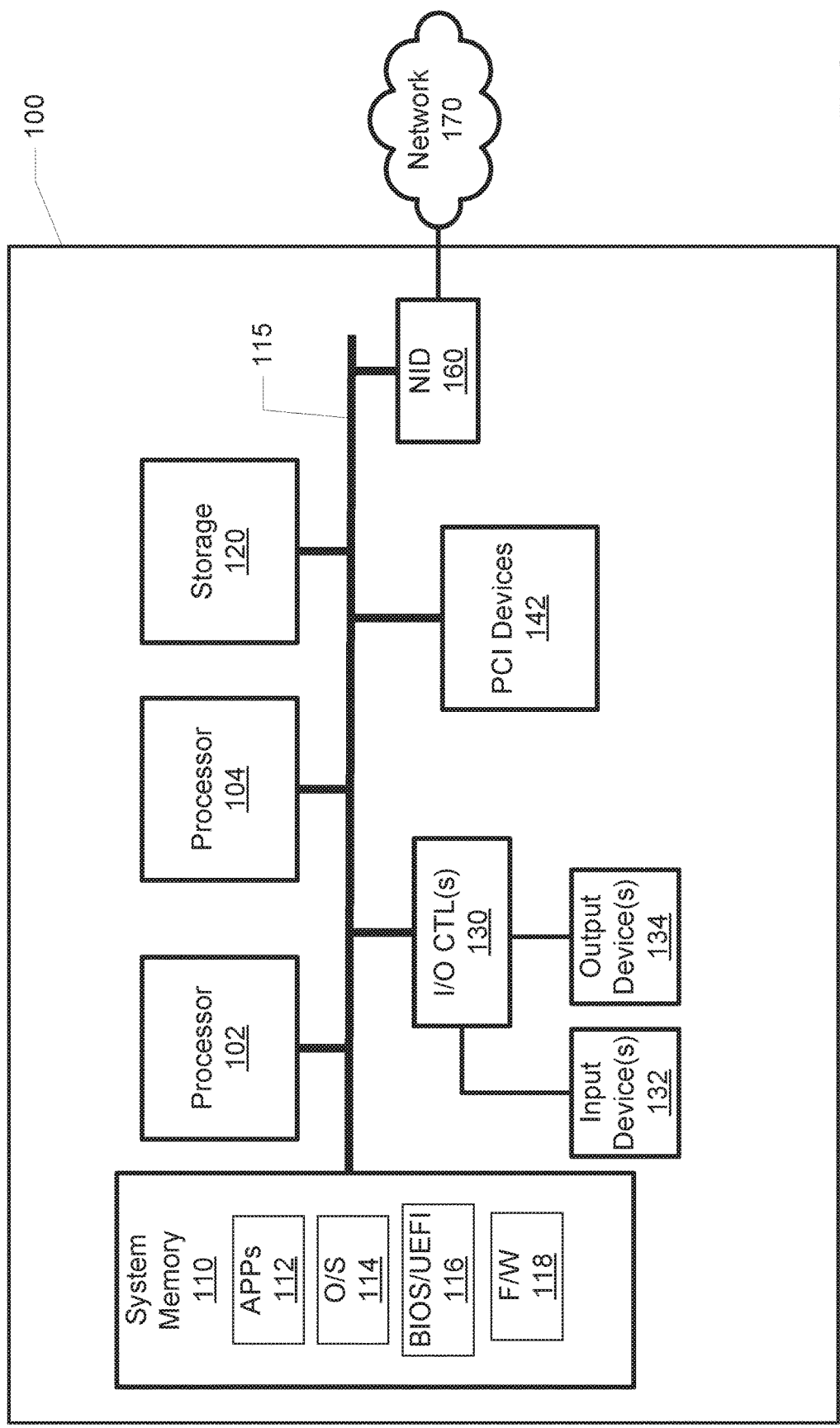
FIG. 1 illustrates an example information handling system that operates as a processing node, according to one or more embodiments.

FIG. 1 illustrates a block diagram representation of an IHS 100, which operates as an example processing node, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring specifically to FIG. 1, example IHS 100 includes one or more processors, such as processor 102 and 104. Processors 102 and 104 are coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, BIOS/UEFI 116, and firmware (F/W) 118. In one or more embodiments, BIOS/UEFI image 116 comprises the additional functionality associated with unified extensible firmware interface (UEFI) and can include UEFI images and drivers. The various software and/or firmware modules have varying functionality when their corresponding program code is executed by processors 102 and/or 104 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). IHS 100 further includes one or more connected PCI device(s) 142. In one embodiment, PCI device(s) 142 can include graphic processing units and storage devices such as solid state drives. PCI device(s) 142 are connected to system interconnect 115.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, a cloud based network and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

Figure 2:
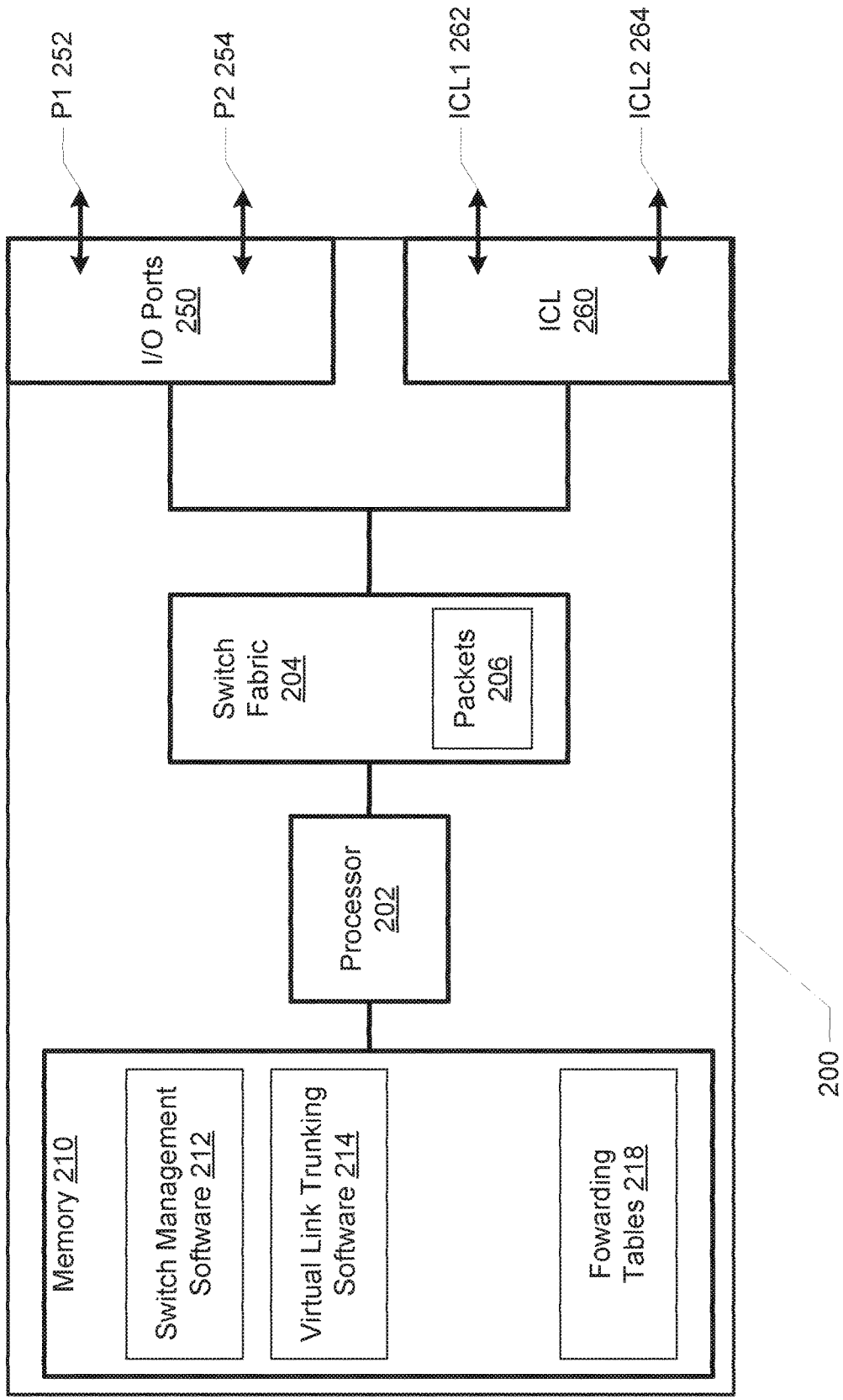
FIG. 2 illustrates an example switch node, according to one or more embodiments.

Referring to FIG. 2, one embodiment of a network switch node or switch 200 is shown. In the description of the following figures, reference will be made to the previously described figures. Switch 200 includes processor 202 coupled to memory 210. Memory 210 can include several software and/or firmware modules including switch management software 212, virtual link trunking (VLT) software 214 and forwarding tables 218. Switch 200 includes switch fabric 204 that is coupled to processor 202. Switch fabric 204 routes packets 206 between various processing nodes and other switches (peer switches). Packets 206 are a group of bits that can be transported across a network. Switch fabric 204 is communicatively coupled to input/output (I/O) ports 250.

In one or more embodiments, the I/O ports 250 are connected to one or more other switches or other IHSs 100, at least some of which form VLT logical aggregation groups (LAGs). I/O ports 250 include port 1 252 and port 2 254. VLT is a layer-2 LAG protocol between end devices, such as servers, connected to different access switches. VLT offers a redundant, load-balancing connection to the network in a loop minimizing environment, reducing the requirement for the use of a spanning-tree protocol. VLT allows link connectivity between a server and the network via two different switches.

One or more ports are connected via inter-connecting links (ICLs) 260 to other switch nodes in a multiple node VLT system. ICL 260 includes ICL 1 262 and ICL 2 264. Within the described embodiments, the terms ports and links can be used inter-changeably. Processor 202 can use information included in the network data (packets 206) received at switch 200 as well as information stored in the forwarding tables 218, to identify a next hop for the network data, among other possible activities. In one embodiment, switch fabric 204 schedules packets 206 for propagation through the network switch node to an egress port for transmission to the next hop. The components of switch 200 can operate to support various embodiments of a multiple node VLT system. In some embodiments, switch 200 can be differently configured and include different components. In one embodiment, processor 202 can cause one or more I/O ports 250 to be blocked, preventing the routing of packets, or unblocked, allowing the routing of packets.

Figure 3:
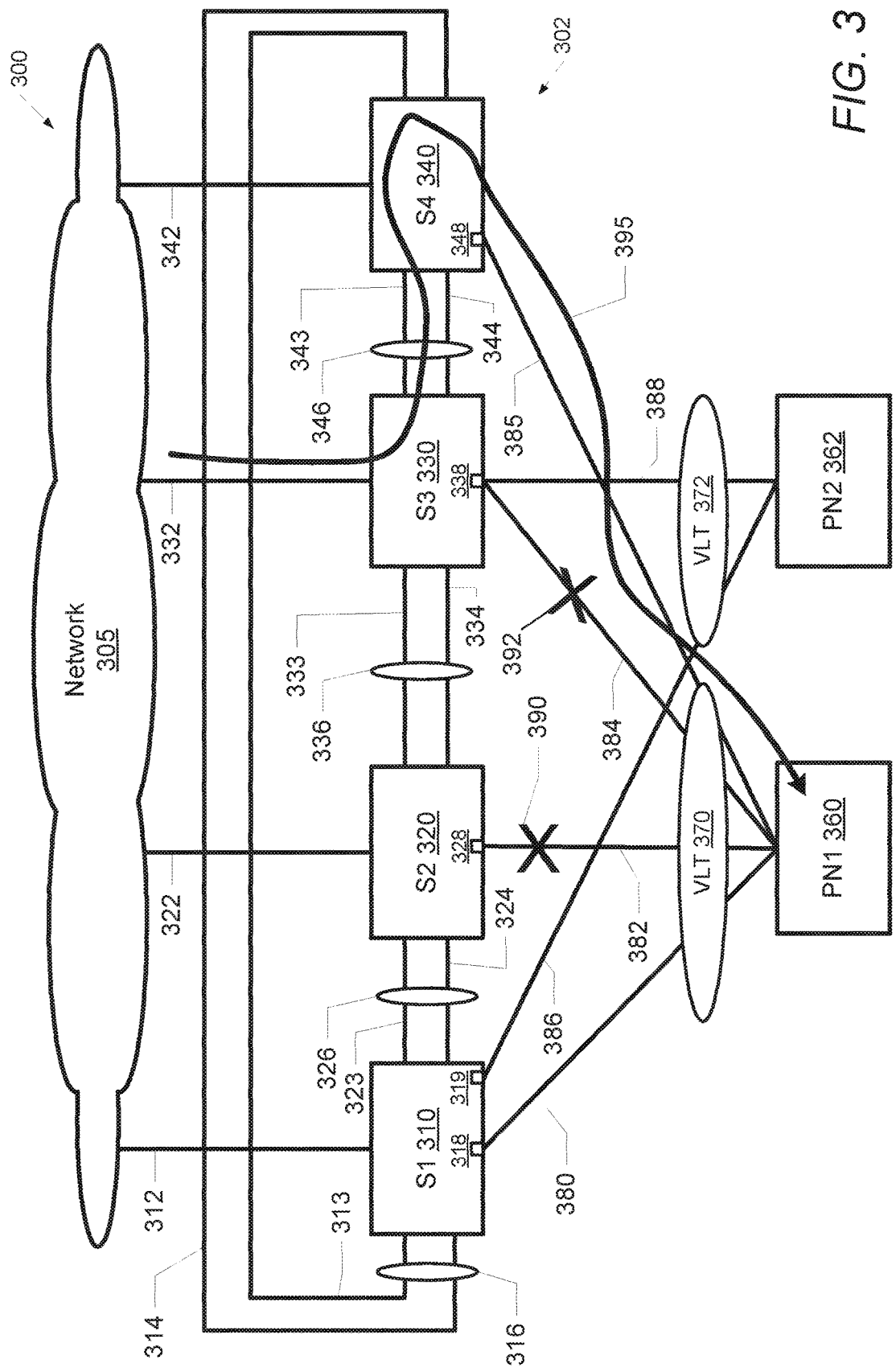
FIG. 3 illustrates an example distributed information handling system within which various aspects of the disclosure can be implemented, according to one or more embodiments.

Referring to FIG. 3, one embodiment of a distributed information handling system (IHS) 300 including several switch nodes and processing nodes is shown. One or more of the described features of the various embodiments of the disclosure can be implemented within IHS 300. IHS 300 includes several switches including switches 310, 320, 330 and 340 and several processing nodes (PNs) 360 and 362. Each of switches 310-340 can have the components of switch 200 of FIG. 2 and each of PNs 360 and 362 can have the components of IHS 100 of FIG. 1. Switches 310-340 are coupled to network 305 via respective links 312, 322, 332 and 342. Network 305 can be a local area network, wide area network, personal area network, a cloud based network and the like, and the connection to and/or between network 305 and Switches 310-340 can be wired or wireless or a combination thereof. For purposes of discussion, Network 305 is indicated as a single collective component for simplicity. However, it is appreciated that network 305 can comprise one or more direct connections to other devices as well as a more complex set of interconnections as can exist within a wide area network, such as the Internet.

Switch 310 is coupled to switch 340 via links 313 and 314 that collectively form first ICL 316. Switch 310 is coupled to switch 320 via links 323 and 324 that collectively form second ICL 326. Switch 310 also includes port 318 that is coupled to PN 360 via link 380 and port 319 that is coupled PN 362 via link 386. Switch 320 includes port 328 that is coupled to PN 360 via link 382. Switch 320 is coupled to switch 330 via links 333 and 334 that collectively form third ICL 336. Switch 330 includes port 338 that is coupled to PN 360 via link 384 and to PN 362 via link 388. Switch 330 is coupled to switch 340 via links 343 and 344 that collectively form fourth ICL 346. Switch 340 includes port 348 that is coupled to PN 360 via link 385.

Those of ordinary skill in the art will appreciate that the hardware and software/firmware components and basic configuration depicted in FIGS. 1-3 and described herein may vary. For example, the illustrative components within distributed IHS 300 (FIG. 3) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Illustrated within IHS 300 is a four-way VLT fabric 302 that includes VLT LAG ports 370 and 372. VLT is a layer-2 LAG protocol between end-devices such as PNs 360 and 362 connected to different switches 310-340. VLT provides the PNs redundant, load-balancing connection to network 305 in a loop minimizing environment. VLT ports 370 and 372 allow virtual link connectivity between a PN and the network via two different switches. VLT port 370 connects PN 360 to all switch peers 310-340 in the VLT fabric 302. VLT port 370 includes links 380, 382, 384, and 385. In an embodiment, VLT port 370 can transmit packets on one or more of links 380, 382, 384, and 385. VLT port 372 connects PN 362 to switch peers 310 and 330 in the VLT fabric 302. VLT port 372 includes links 386 and 388. In an embodiment, VLT port 372 can transmit packets on one or more of links 386 and 388.

An active switch peer for a given VLT port is a switch that has an active port. An inactive switch peer for a given VLT port is a switch that either does not have the VLT port configured for that specific switch or one in which the port is blocked, inoperable, or down. In one embodiment, as is depicted within example IHS 300, a failure 390 has occurred in link 382 or port 328 of VLT port 370 and a failure 392 has occurred in link 384 or port 338 of VLT port 370. Switches 310 and 340 are active peer switches and switches 320 and 330 are inactive peer switches for VLT port 370 because the links or ports are down. Switches 310 and 330 are active peer switches and switches 320 and 340 are inactive peer switches for VLT port 372 because VLT 372 is not configured with these switches.

When packet traffic destined to a PN connected by a VLT port enters an inactive switch peer for that VLT port from the network or from another VLT port, the packet needs to reach the remote host without duplication. For example, a packet destined for PN 360 that ingresses peer switch 330 from network 305 or from PN 362 needs to reach PN 360 without being duplicated. VLT fabric 302 can perform this routing of packets by designating an active switch peer to be the forwarding switch for every VLT, inactive switch peer combination, or tuple. As utilized herein, a tuple is a finite ordered list of the members or elements of the list. For example, In FIG. 3, either switch 310 or 340 could be the chosen forwarding switch for VLT port 370 when switch 320 is an inactive switch peer and when switch 330 is an inactive switch peer. Path 395 illustrates the transmission of a packet destined for PN 360 that ingresses peer switch 330 from the network. The packet is routed by VLT port 370 by a first hop via ICL 346 to switch 340 and then by a second hop via link 385 to PN 360. Switches 310 or 330 could be the chosen forwarding switch for VLT port 372 when switch 320 is an inactive switch peer and when switch 340 is an inactive switch peer.

The determination of a forwarding switch for a VLT port is a complex problem that requires preventing looping and minimizing the necessary inter-connecting link bandwidth. Routes that require fewer numbers of hops are preferred over routes with more hops. The faster that a determination of a forwarding switch can be made reduces the convergence time for a possible VLT port switch peer failure. The distributed nature of determining a forwarding switch for a VLT port does not have a centralized controller and therefore there is no single point of failure. According to one aspect of the disclosure, all active switch peers for a given VLT need to consistently pick the same forwarding switch for a given VLT port and inactive switch peer combination.

In one embodiment, forwarding tables 218 can be calculated that contain a list of pre-determined forwarding switches for all possible active and inactive peer switch combinations based on VLT link states. Virtual link trunking software 214 includes an algorithm that generates forwarding table 218 based on the following rules:

1. Switch nodes that are active switch peers for a VLT port are always the forwarding switch for packets entering the switch fabric at the switch node.

2. Switch nodes that are active switch peers for a VLT port will block packets that entered the switch fabric at another active switch peer.

3. Only active switch peers need to determine if they are the forwarding switch for inactive switch peers for a VLT port.

4. For an N-way VLT switch fabric, the maximum number of active and inactive switch peers for a VLT port is $2^N$.

5. Any VLT port with an active peer will have $2^{(N-1)}$ possible permutations. The permutations where a switch peer's local VLT port is down or not configured is ignored reducing the number of possible permutations by half.

6. Typical VLT fabrics have around 4 switch nodes (N=4), while the number of VLT ports can be on the order of hundreds or thousands. Because N is small, a forwarding table containing all $2^{(N-1)}$ possible permutations of active and inactive switch peers can be pre-determined and matched to a given VLT port.

Figure 4C:
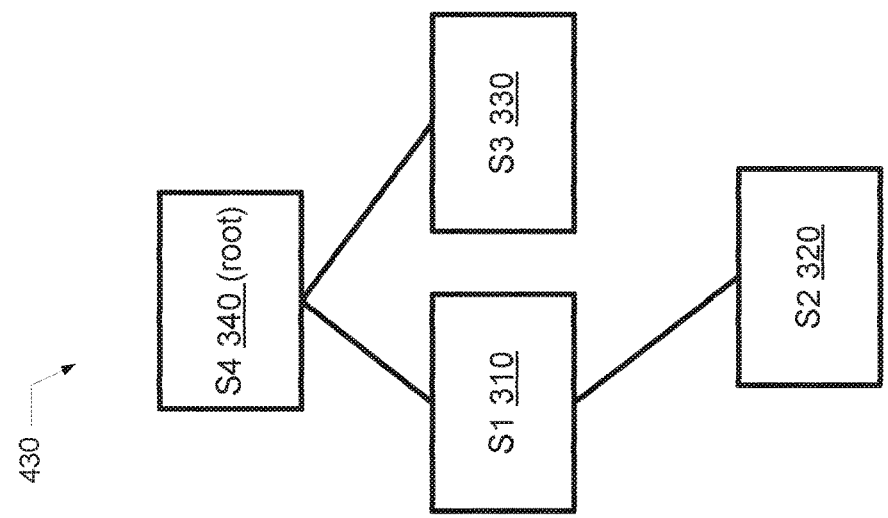
FIG. 4C illustrates an additional example shortest path tree, according to one or more embodiments.
Figure 4B:
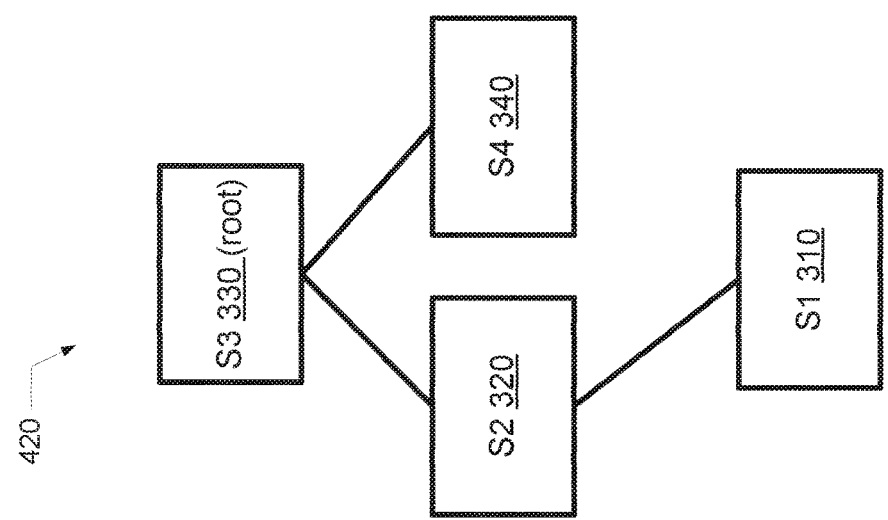
FIG. 4B illustrates another example shortest path tree, according to one or more embodiments.
Figure 4A:
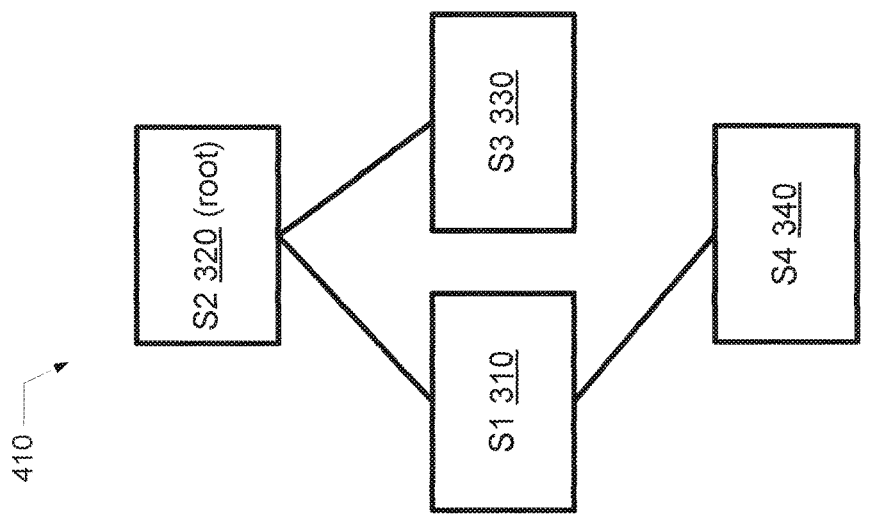
FIG. 4A illustrates an example shortest path tree, according to one or more embodiments.

FIGS. 4A, 4B and 4C, illustrate embodiments of shortest path trees (SPT) 410, 420 and 430. The SPTs 410, 420, and 430 represent the shortest distance or path for a packet to be routed or to hop from one switch to another. The forwarding tables 218 are determined at least partially based on one or more of SPTs 410, 420 and 430. SPTs 410, 420 and 430 are the SPTs for switch 310. Switch 310 allocates a unique ranking number for each of the other switch peers 320, 330 and 340 in VLT fabric 302. The ranking number represents the bit position of the switch peer in a forwarding table index. For example, switch 320 could be allocated the number 1, switch 330 the number 2, and switch 340 the number 3. The closest active switches with the shortest routing distance can then be determined from (i.e., can be identified by) the lowest ranking number. For each switch in SPTs 410, 420, and 430, a hop count can be generated. The hop count represents the number of links that are transited to reach a destination switch. For example for SPT 410, to reach switch 340 from switch 320, two hops are required.

In one or more embodiments, the switches compute an SPT for every other node in the switch fabric. SPT 410 is rooted at switch 320. SPT 420 is rooted at switch 330. SPT 410 is rooted at switch 340. With specific reference to FIG. 4A, SPT 410 illustrates that one hop or connection is required to transit from the root switch (320) to either switch 310 or 330 and two hops are required to transit to switch 340. In case of a tie for the ranking number, the tie breaker used can be the lowest media access control (MAC) address, in one embodiment. In one embodiment, switch 310 can have the lowest MAC address, switch 320 a higher MAC address, switch 330 a still higher MAC address, and switch 340 the highest MAC address.

Referring to FIG. 5, a forwarding table 500 is shown. Forwarding table 500 contains a list of pre-determined forwarding switches for all possible active and inactive peer switch combinations based on VLT link states. Forwarding table 500 is generated for switch 310. Forwarding table 500 contains block and unblock actions 502 for switches 340, 330 and 320. In one embodiment, processor 202 (FIG. 2) executing VLT software 214 can generate forwarding table 500.

In one embodiment, forwarding table 500 can be generated or calculated by the following steps:

1. Each switch peer in the VLT switch fabric except for the local switch peer is assigned a unique number (N-1).
2. The SPTs (410-430) rooted at each switch peer except the local switch peer are generated.
3. A forwarding table 500 of size $2^{(N-1)}$ is allocated where each row of indexes 520 for switches S4, S3 and S2 represent a unique permutation of active and inactive switch peers. In the index, an active switch peer is assigned a "1" and an inactive switch peer is assigned a "0";
4. For each table entry with an index of "0", representing all switch peers being inactive, all switch peers are marked as unblock.
5. For each table entry with an index of $(2^{(N-1)}-1)$, which represents all switch peers being active, all switch peers are marked as block;
6. For each table entry with an index of $(2^{(N-1)-2})$, a determination is made whether the local switch peer is the closest active switch peer for an inactive switch peer. For an inactive switch peer, the closest local switch peer is the one with the lowest number or switches to be transited or lowest number hop count to be reached. For an active switch peer, the closest active switch peer is itself. If the local switch peer is the closest active switch peer for an inactive switch peer, the local switch peer is marked as "unblock" in forwarding table 500. Otherwise, the local switch peer is marked as "block" in forwarding table 500.

With continued reference to FIG. 5, a forwarding table 500 includes eight indexes 520. Indexes 520 include index 522 of 0 corresponding to a bitmask of (000) where the first bit represents switch S4 340 being active (1) or inactive (0), the second bit represents switch S3 330 being active (1) or inactive (0), and the third bit represents switch S2 320 being active (1) or inactive (0). Indexes 520 further include index 524 of decimal value 1 corresponding to a bitmask of (001), index 526 of decimal value 2 corresponding to a bitmask of (010), index 528 of decimal value 3 corresponding to a bitmask of (011), index 530 of decimal value 4 corresponding to a bitmask of (100), index 532 of decimal value 5 corresponding to a bitmask of (101), index 534 of decimal value 6 corresponding to a bitmask of (110), and index 536 of decimal value 7 corresponding to a bitmask of (111).

An example construction of forwarding table 500 will now be described. For index 0 (000) 522, the action 502 is set to unblock the ports for all switch peers (340, 330, 320) because all the switch peers are active. For index 7 (111) 536, the action is set to block for all switch peers (340, 330, 320) because all switch peers are inactive. For index 1 (001) 524, which represents switch 320 being an active switch peer while switches 330 and 340 are inactive switch peers, switch 320 is the closest active switch peer to itself based on hop count from the SPTs (not switch 310), and the action is set to block. For switch 330, the closest active switch peer is switch 320 (i.e., not switch 310) (from SPT 420), and the action is set to block. This is because the number of hops to reach switch 310 from switch 330 is two hops and the number of hops to reach switch 320 from switch 330 is one hop. Based on the hop count switch 320 is closer than switch 310. For switch 340, the closest active switch peer is switch 310 (from SPT 440), and the action is set to unblock. In the case of a tie in the closest active switch peer (tied hop count), the switch peer with the lowest MAC address is selected as the closest active switch peer. The remaining actions 502 in the table for the other indexes are determined in a similar manner.

During operation, when a VLT port such as VLT 370 is configured on switch peers or a VLT port state changes on any switch peer in the VLT fabric, each of the switch peers does the following: (1) The local switch peer, for example switch 310, calculates or determines an index 520 by constructing a bitmask of the current active and inactive switch peers for VLT port 370; (2) During operation, the remote switch peers (i.e. switches 320, 330, 340) transmit their status (active or inactive) to the local switch peer (i.e. switch 310) If a remote switch peer (i.e. switches 320, 330, 340) has indicated their VLT port state is active, a "1" is set for that switch peer position in the bit mask; (3) If a remote switch peer (i.e. switches 320, 330, 340) has indicated their VLT port state is inactive, a "0" is set for that switch peer position in the bit mask; (4) If a remote switch peer (i.e. switches 320, 330, 340) has not indicated any VLT port state, a "0" is set for that switch peer position in the bit mask; (5) Using the constructed bitmask, the corresponding index in forwarding table 500 is identified and the block/unblock actions associated with the index are retrieved for the switch peers from forwarding table 500; (6) A difference in the current and the previous block/unblock actions is determined for each switch peer for that VLT port; (7) Based on the determined differences, the virtual ports (VLT 1 370) are updated with the current block and unblock actions; and (8) At the same time, the real ports (i.e. ports 328, 338 and 348) in each of the respective switches are updated with the current block/unblock actions for each respective port.

Figure 6B:

Referring to FIGS. 6A and 6B, another embodiment of forwarding tables, tables 600 and 650, are shown. Forwarding tables 600 and 650 contain a list of pre-determined forwarding switches for all possible active and inactive peer switch combinations based on VLT link states. If the lowest MAC address is used as a tie breaker, when there is a tie in the ranking number, in certain switch fabric topologies (like ring), the switch peer with the lowest MAC address can be selected as the forwarding switch for a large number of the VLT ports. The switch peer with the lowest MAC address can cause an oversubscription of the ICL connected to that switch. In order to minimize or reduce this problem, a switch node can generate more than one forwarding table each having different actions 502. The different forwarding tables can use different but consistent criteria during their generation. For example, forwarding table 600 has been generated using the lowest MAC address as a tie-breaking criteria while, forwarding table 650 has been generated using the highest MAC address as a tie-breaking criteria. A switch peer can select one of the forwarding tables based on pre-determined criteria in order to determine a VLT forwarding switch. In one embodiment, a switch could use forwarding table 600 for odd-numbered VLT ports and forwarding table 650 for even-numbered VLT ports, or vice versa.

Figure 7:
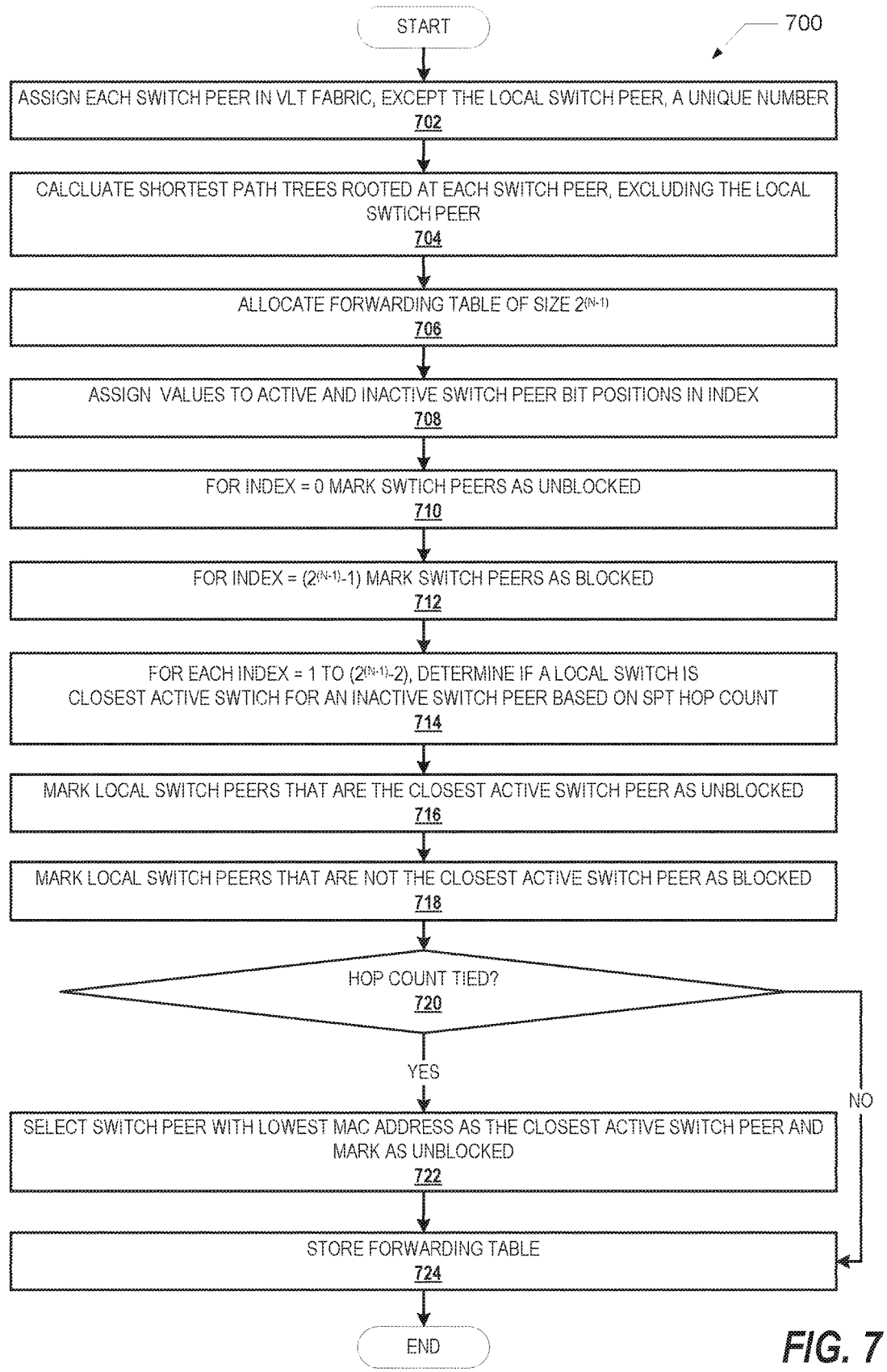
FIG. 7 is a flow chart illustrating one example of a method of generating a forwarding table.
Figure 8:
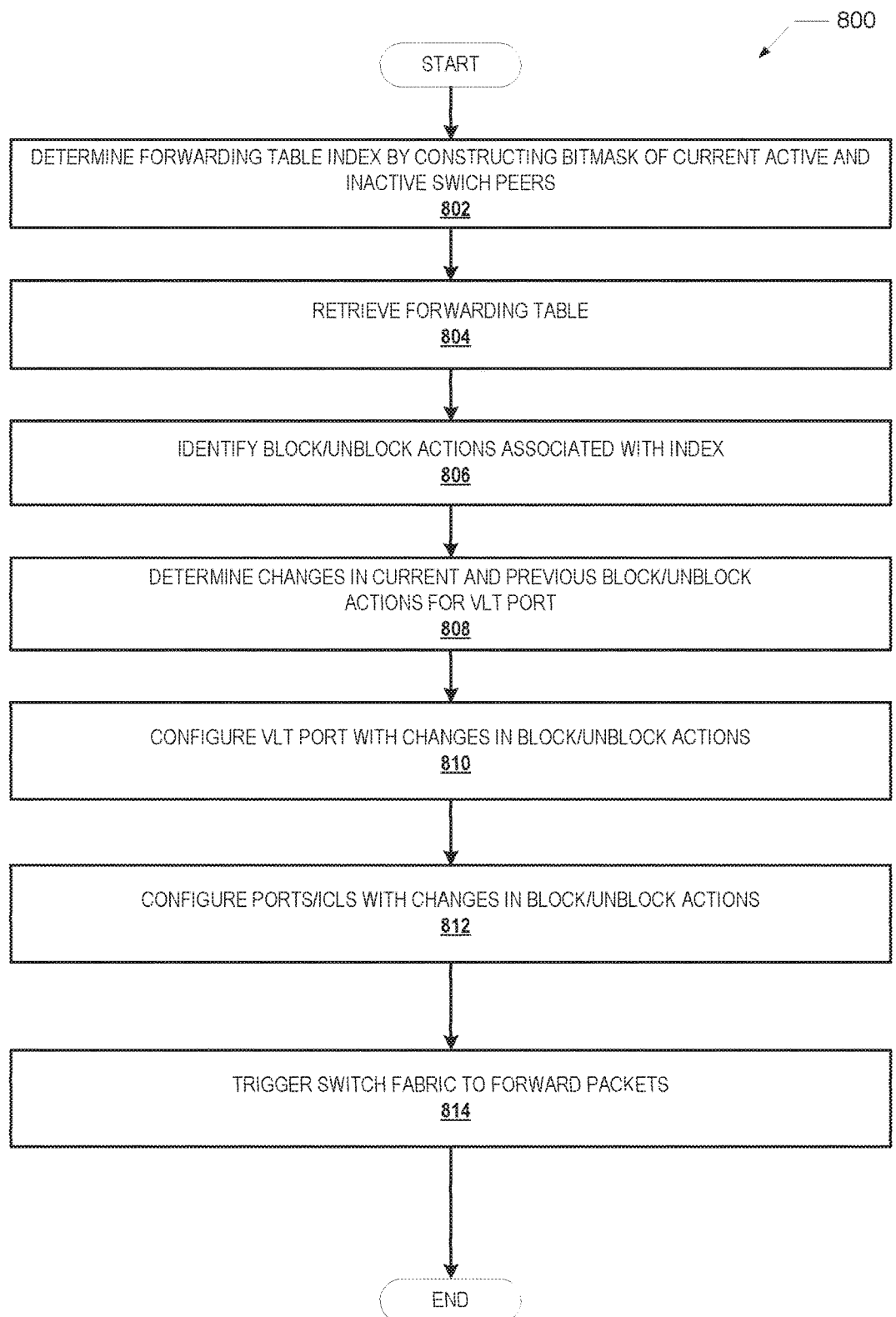
FIG. 8 is a flow chart illustrating one example of a method of determining which VLT ports to block and unblock based on a pre-determined forwarding table.

FIGS. 7 and 8 illustrate flowcharts of exemplary methods 700 and 800 by which processor 202 within the preceding figures performs different aspects of the processes that enable the one or more embodiments of the disclosure. Method 700 represents a computer-implemented method of generating a forwarding table in an IHS. Method 800 represents a computer-implemented method of determining VLT ports to block and unblock based on the forwarding table entries. The description of methods 700 and 800 are provided with general reference to the specific components illustrated within the preceding FIGS. 1-6. Methods 700 and 800 are generally described as being implemented via processor 202 and particularly the execution of code provided by VLT software 214 acting within IHS 200. It is however appreciated that certain aspects of the described methods may be implemented via other processing devices and/or execution of other code.

Referring now to the flow chart of FIG. 7, method 700 begins at the start block and proceeds to block 702 where processor 202 assigns each switch peer in the VLT fabric 302, except for the local switch peer (310), a unique number (N−1), where N is the number of nodes in the switch fabric. Processor 202 calculates SPTs 410-430 rooted at each switch peer, except for the local switch peer (block 704). Processor 202 allocates a forwarding table 500 of size $2^{(N-1)}$, including rows of indexes 520 for switches 340, 330 and 320 that each represent a unique permutation of active and inactive switch peers (block 706). For each of indexes 522-536, processor 202 assigns an active switch peer a "1" bit position and an inactive switch peer is assigned a "0" bit position (block 708).

At block 710, for each table entry with an index of "0", representing all switch peers being inactive, processor 202 marks all switch peers as unblocked in the table entry (row). For each table entry with an index of $(2^{(N-1)}-1)$, which represents all switch peers being active, all switch peers are marked by processor 202 as blocked in the table row (block 712). At block 714, for each table entry with an index of 1 to $(2^{(N-1)}-2)$, processor 202 determines if the local switch peer is the closest active switch peer for an inactive switch peer based on the SPT hop count. For an inactive switch peer, the closest local switch peer is the switch requiring the lowest number or intermediary transit switches or the switch that is the lowest number hop count away. For an active switch peer, the closest active switch peer is itself. If the local switch peer is the closest active switch peer for an inactive switch peer, processor 202 indicates or sets the action 502 for the local switch peer to unblock, in forwarding table 500 (block 716). If the local switch peer is not the closest active switch peer for an inactive switch peer, processor 202 indicates or sets the action 502 for the local switch peer to block in forwarding table 500 (block 718). Processor 202 determines if a tie has occurred in the hop count (decision block 720). In response to a tie occurring in the hop count, processor 202 selects the switch having the lowest MAC address as the closest active switch and sets at least one entry in the forwarding table 500 for the switch as unblocked (block 722). Processor 202 then stores forwarding table 500 to forwarding tables 218 of memory 210 (block 724). Method 700 then ends. In response to a tie not occurring in the hop count, processor 202 stores forwarding table 500 to forwarding tables 218 of memory 210 (block 724).

Referring now to the flow chart of FIG. 8, which illustrates method 800. During operation of IHS 300, when a VLT port such as VLT 370 is configured on a switch peer or the VLT port state changes on any switch peer in the VLT fabric, each of the switch peers performs method 800. Method 800 begins at the start block and proceeds to block 802 where processor 202 generates or determines a specific forwarding table index (i.e. one of indexes 522-536) by constructing a bit mask of the current active and inactive switch peers for VLT port 370. When switch 310 is the local switch, the switch peers are switches 320, 330 and 340. During operation of IHS 300, the remote switch peers (i.e. switches 320, 330, 340) transmit their status (active or inactive) to the local switch peer (i.e. switch 310). If a remote switch peer (i.e. switches 320, 330, 340) has indicated their VLT port state is active, a "1" is set for that switch peer position in the bit mask. If a remote switch peer (i.e. switches 320, 330, 340) has indicated their VLT port state is inactive, a "0" is set for that switch peer position in the bit mask. If a remote switch peer (i.e. switches 320, 330, 340) has not indicated any VLT port state, a "0" is set for that switch peer position in the bit mask.

Processor 202 retrieves forwarding table 500 from memory 210 (block 804). Using the constructed bitmask, the corresponding index (i.e. one of indexes 522-536) is used to identify the block/unblock actions associated with the index (block 806). At block 808, differences or changes between the current and the previous block/unblock actions are determined for each switch peer associated with the VLT port. Based on the determined differences or changes, the VLT port (VLT 370) is configured or updated with the current block and unblock actions (block 810). The hardware ports 250 and ICLs 260 are configured or updated by processor 202 with the changes in the block/unblock actions (block 812). At block 814, processor 202 triggers the switch fabric 204 to forward received packets 206 based on the current block and unblock actions for the VLT port. Method 800 then ends.

The use of forwarder table 500 and methods 700 and 800 have several advantages, including: (1) The forwarder table computation is a function of the number of VLT switch peers and not of the number of VLT ports; (2) Forwarding table 500 does not need to be re-computed when subsequent changes to VLT member port states occur. Forwarding table 500 only needs to be re-computed when the switch fabric topology changes (ICL links or VLT switch peers go down or become disconnected). (3) When a VLT member port state changes, each of the switch nodes 310-340 only need to perform a single lookup to determine block/unblock masks for hardware port and ICL configuration. This has a significant improvement on convergence times for VLT port state changes.

Figure 9:
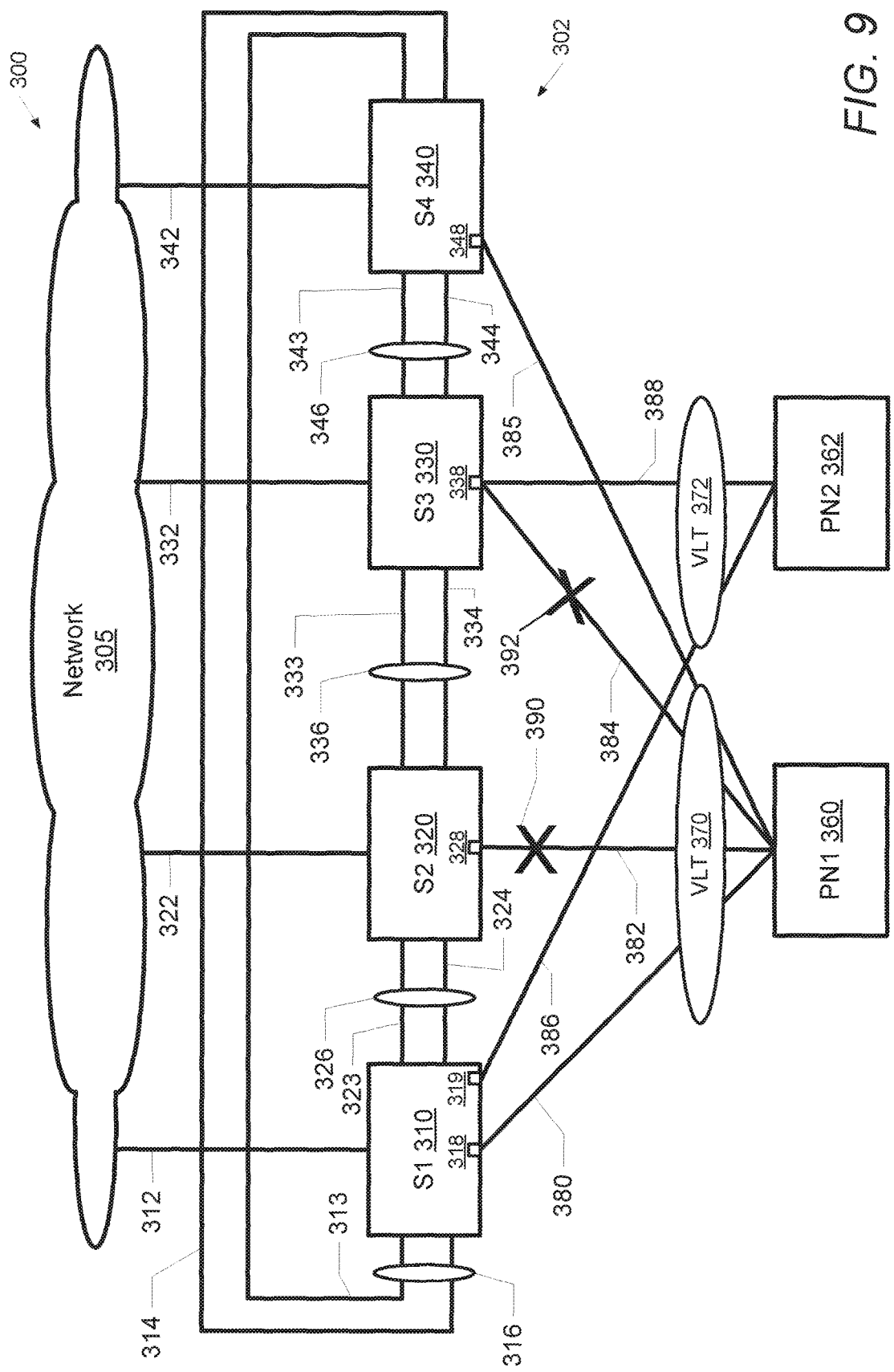
FIG. 9 is an example information handling system illustrating various aspects of the disclosure, according to one or more embodiments.

With reference to FIG. 9, IHS 300 is shown illustrating example embodiments, using methods 700 and 800. The description of FIG. 9 is provided with general reference to the specific components illustrated within the preceding FIGS. 1-8. In a first embodiment, assume there are no VLT port failures and that VLT port state information has been synched between the switch peers in IHS 300. Switch 310 generates an index 536 of decimal value 7 for VLT port 370 and index 526 of decimal value 2 for VLT port 372 and retrieves forwarding table 500. Based on the corresponding actions 502 for index 536 of decimal value 7, switch 310 blocks traffic from switches 320, 330 and 340 toward VLT port 370. Switch 310 blocks traffic from switch 330 toward VLT port 372 and unblocks traffic from switches 320 and 340 toward VLT port 372.

In a second embodiment, the member port or link 382 for VLT port 370 on switch 320 fails first followed by a failure of the member port or link 384 for VLT port 370 on switch 330. When the member port for VLT 370 on switch 320 fails, switch 310 generates an index 534 of decimal value 6 and retrieves forwarding table 500. The corresponding actions 502 for index 534 of decimal value 6 in forwarding table 500 are to block traffic from switches 340 and 330 and to unblock traffic from switch 320. Because switches 340 and 330 are already blocked toward VLT port 370, switch 310 only needs to remove the block or unblock traffic from switch 320 toward VLT port 370.

When the member port for VLT 370 on switch 330 fails, switch 310 generates an index 530 of decimal value 4 and retrieves forwarding table 500. The corresponding actions 502 for index 530 of decimal value 4 in forwarding table 500 are to block traffic from switches 340 and 330 and to unblock traffic from switch 320. The block and unblock actions for index 530 are the same as for the previous generated index 534. Because the block and unblock actions are the same, no changes are required.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of communication for an information handling system using virtual link trunking (VLT), the method comprising:
   determining a forwarding table index for a local switch of currently active and inactive switch peers (switch peers) for a VLT port by constructing a bit mask of the currently active and inactive switch peers for the VLT port, wherein the bit mask is utilized to enable a packet to reach a remote host without duplication;

retrieving a pre-determined forwarding table associated with the switch peers from a memory, the pre-determined forwarding table containing a plurality of port blocking and unblocking actions for the switch peers of the VLT port;

identifying current port blocking and unblocking actions in the pre-determined forwarding table corresponding to the forwarding table index; and configuring a plurality of I/O ports for the local switch based on the identified current port blocking and unblocking actions.

2. The method of claim 1, further comprising:

determining changes between previous port blocking and unblocking actions and the current port blocking and unblocking actions; and configuring the VLT port based on the determined changes in the current port blocking and unblocking actions.

3. The method of claim 1, further comprising:

forwarding received packets, via a switch fabric, based on the identified current port blocking and unblocking actions.

4. The method of claim 1, wherein retrieving the pre-determined forwarding table further comprises:

assigning a unique number to each switch peer in a switch fabric except for the local switch;

calculating at least one shortest path tree (SPT) rooted at each of the switch peers;

generating the forwarding table including rows of indexes that represent a unique permutation of active and inactive switch peers;

assigning bit position values in the indexes to active switch peers and to inactive switch peers;

setting entries in the forwarding table as one of blocked and unblocked for the switch peers based on the bit position values; and storing the forwarding table to a memory.

5. The method of claim 4, further comprising:

determining a plurality of hop counts for the switches based on the number of switches to be transited;

determining if the local switch is a closest active switch for an inactive switch peer based on a hop count having a lowest value.

6. The method of claim 5, further comprising:

determining if a tie has occurred in the hop count having the lowest value;

in response to the tie occurring in the hop count, selecting a first switch having a lowest MAC address as a closest active switch;

setting at least one entry in the forwarding table for the first switch as unblocked.

7. The method of claim 1, further comprising:

retrieving a plurality of the pre-determined forwarding tables from the memory; and selecting at least one of the plurality of pre-determined forwarding tables to be used in identifying current port blocking and unblocking actions corresponding to the forwarding table index.

8. An information handling system (IHS) comprising:

a plurality of switches, at least a portion of the plurality of switches facilitating communications with at least one processing node (PN) via a plurality of input/output (I/O) ports, the plurality of switches facilitating communication with each other via a plurality of interconnecting links (ICLs), the switches configurable to be part of one or more virtual link trunking (VLT) ports wherein, the switches comprise a local switch and at least one switch peer, the local switch including a processor and a memory device communicatively coupled to the processor, the memory device storing VLT software, wherein the VLT software configures the local switch to:

determine a forwarding table index for the local switch of currently active and inactive switch peers (switch peers) for a VLT port by constructing a bit mask of the currently active and inactive switch peers for the VLT port, wherein the bit mask is utilized to enable a packet to reach a remote host without duplication;

retrieve a pre-determined forwarding table associated with the switch peers from a memory containing a plurality of port blocking and unblocking actions for the switch peers of the VLT port;

identify current port blocking and unblocking actions in the pre-determined forwarding table corresponding to the forwarding table index; and configure a plurality of I/O ports for the local switch based on the identified current port blocking and unblocking actions.

9. The information handling system of claim 8, wherein the VLT software further configures the local switch to:

determine changes between previous port blocking and unblocking actions and the current port blocking and unblocking actions; and configure the VLT port based on the determined changes in the current port blocking and unblocking actions.

10. The information handling system of claim 8, wherein the VLT software further configures the local switch to:

forward received packets based on the identified current port blocking and unblocking actions.

11. The information handling system of claim 8, wherein retrieving the pre-determined forwarding table comprises the VLT software further configuring the local switch to:

assign a unique number to each switch peer in a switch fabric except for the local switch;

calculate at least one shortest path tree (SPT) rooted at each of the switch peers;

generate the pre-determined forwarding table including rows of indexes that represent a unique permutation of active and inactive switch peers;

assign bit position values in the indexes to active switch peers and to inactive switch peers;

set entries in the pre-determined forwarding table as one of blocked and unblocked for the switch peers based on the bit position values; and store the forwarding table to a memory.

12. The information handling system of claim 11, wherein the VLT software further configures the local switch to:

determine a plurality of hop counts for the switches based on the number of switches to be transited; and determine if the local switch is a closest active switch for an inactive switch peer based on a hop count.

13. The information handling system of claim 12, wherein the VLT software further configures the local switch to:

determine if a tie has occurred in the hop count;

in response to the tie occurring in the hop count, select a first switch having a lowest MAC address as the closest active switch; and set at least one entry in the pre-determined forwarding table for the first switch as unblocked.

14. The information handling system of claim 8, wherein the VLT software further configures the local switch to:
 retrieve a plurality of the pre-determined forwarding tables from the memory; and
 select at least one of the plurality of pre-determined forwarding tables to be used in identifying current port blocking and unblocking actions corresponding to the forwarding table index.

15. A virtual link trunking (VLT) system comprising:
 a plurality of switches, at least a portion of the plurality of switches facilitating communications with at least one processing node (PN) via a plurality of input/output (I/O) ports, the plurality of switches facilitating communication with each other via a plurality of inter-connecting links (ICLs), the switches configurable to be part of one or more VLT ports, wherein, the plurality of switches comprise a local switch and at least one switch peer, the local switch including a processor and a memory device communicatively coupled to the processor, the memory device storing VLT software, wherein the VLT software configures the local switch to:
 determine a forwarding table index for the local switch of currently active and inactive switch peers (switch peers) for a VLT port by constructing a bit mask of the currently active and inactive switch peers for the VLT port, wherein the bit mask is utilized to enable a packet to reach a remote host without duplication;
 retrieve a pre-determined forwarding table associated with the switch peers from a memory containing a plurality of port blocking and unblocking actions for the switch peers of the VLT port;
 identify current port blocking and unblocking actions in the pre-determined forwarding table corresponding to the forwarding table index; and
 configure a plurality of I/O ports for the local switch based on the identified current port blocking and unblocking actions.

16. The VLT system of claim 15, wherein the VLT software further configures the local switch to:
 determine changes between previous port blocking and unblocking actions and the current port blocking and unblocking actions; and
 configure the VLT port based on the determined changes in the current port blocking and unblocking actions.

17. The VLT system of claim 15, wherein the VLT software further configures the local switch to:
 forward received packets based on the identified current port blocking and unblocking actions.

18. The VLT system of claim 15, wherein retrieving the pre-determined forwarding table comprises the VLT software further configuring the local switch to:
 assign a unique number to each switch peer in a switch fabric except for the local switch;
 calculate at least one shortest path tree (SPT) rooted at each of the switch peers;
 generate the forwarding table including rows of indexes that represent a unique permutation of active and inactive switch peers;
 assign bit position values in the indexes to active switch peers and to inactive switch peers;
 set entries in the pre-determined forwarding table as one of blocked and unblocked for the switch peers based on the bit position values; and
 store the forwarding table to a memory.

* * * * *